Aug. 18, 1953   Z. W. MERKLEY ET AL   2,648,940
IRRIGATION DITCH DEMOSSER AND CLEANER
Filed Oct. 2, 1952
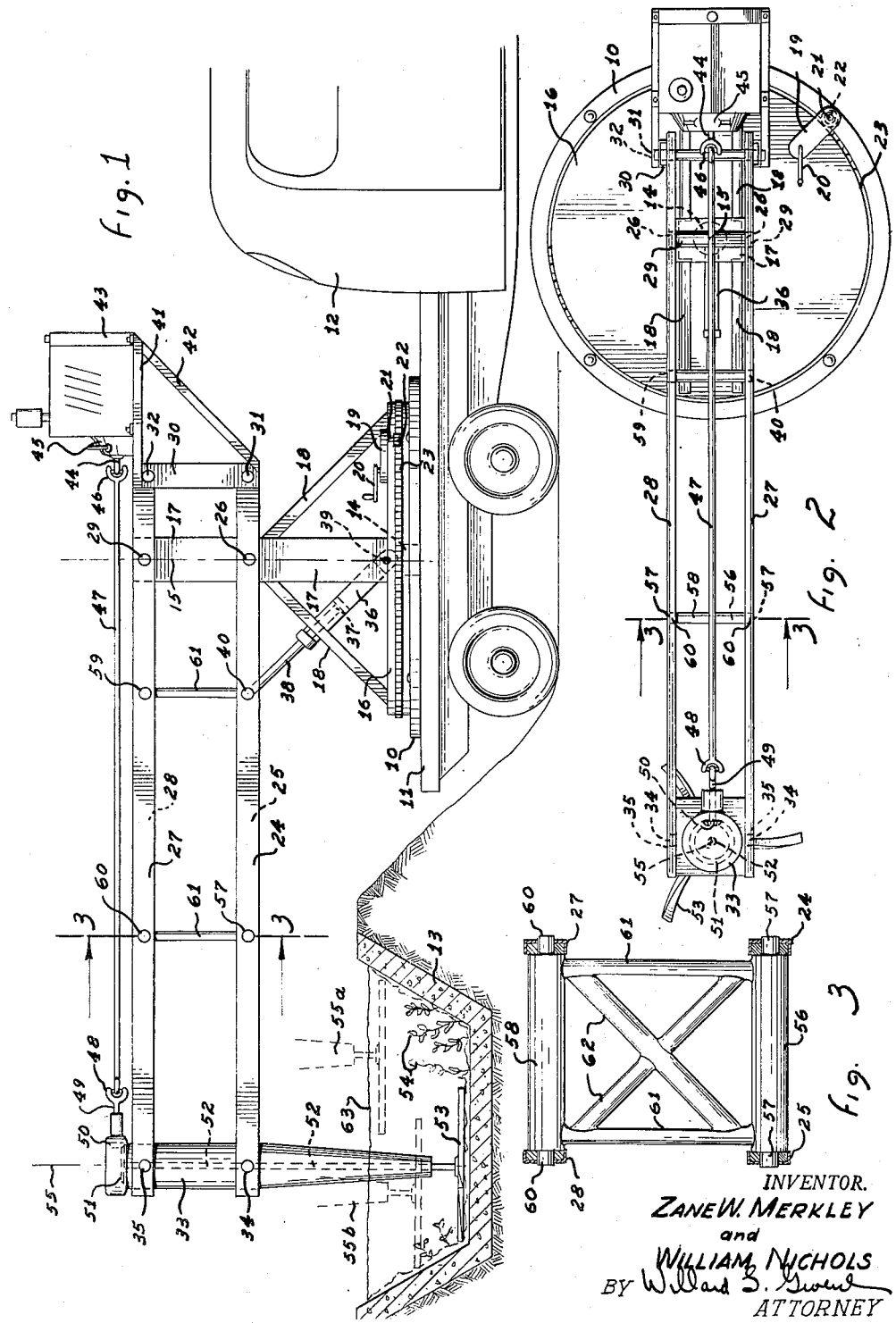
INVENTOR.
ZANE W. MERKLEY
and
WILLIAM NICHOLS
BY
ATTORNEY Patented Aug. 18, 1953

2,648,940

UNITED STATES PATENT OFFICE 2,648,940

IRRIGATION DITCH DEMOSSER AND CLEANER

Zane W. Merkley and William Nichols, Mesa, Ariz.

Application October 2, 1952, Serial No. 312,814

7 Claims. (Cl. 56—8)

1

This invention pertains to improvements in irrigation ditch demossing and cleaning apparatus and is particularly directed to a universal apparatus for removing aquatic growths from both lined and unlined irrigation ditches.

One of the difficult problems in the maintenances of irrigation ditches in the southwest area is that of removing and cleaning irrigation ditches of moss and other aquatic growths which occur below water line and seriously impede the flow of water through the ditch. Because of the prevalence of bright sunshine and high temperature in such areas such aquatic growths rapidly propagate and adhere to the bottom and sides of irrigation ditches to greatly reduce the rate of flow and at the same time trap brush, leaves and other floating materials so as to completely stop the proper flow of water in the ditches and thereby upset the balance of the overall irrigation system and the proper amount of water application to each user's field.

Therefore, one of the objects of the present invention is to provide an improved irrigation ditch demosser and cleaner of simple and universal construction which may be readily presented to the irrigation ditch without removal of the water from the ditch and during the normal operation of the ditch while at the same time removing sub-growths below water line.

Still another object of this invention is to provide an improved demossing and cleaning device for cutting out subaqueous growths in irrigation ditches during the normal operation of said ditches.

Still another object of this invention is to provide an improved irrigation ditch maintenance apparatus of versatile and universal operation which may be carried upon a truck frame or other mobile vehicle and readily applied to the irrigation ditch during its normal operation without necessitating drainage or other special action with regard to the ditch.

Still another object of this invention is to provide an improved growth-cutting device which may be manipulated in the normally flowing irrigation ditch to remove sub-aqueous growths without interfering with the normal flow and operation of the irrigation system.

And a further object of this invention is to provide an improved irrigation ditch maintenance device having a cutting member which is maintained on a vertical rotating spindle in a position of parallel movement while moving about over the sides and bottoms of an irrigation ditch.

Further features and advantages of this invention will appear from a detailed description of the drawings in which:

Fig. 1 is a side elevation of the irrigation ditch demosser and cleaner apparatus incorporating the features of this invention.

Fig. 2 is a plan view of the apparatus shown in Fig. 1.

Fig. 3 is an enlarged cross sectional view taken on the line 3—3 of Figs. 1 and 2.

As exemplary of one embodiment of this invention there is shown an irrigation ditch demosser and cleaner apparatus incorporating the features of this invention comprising a base member 10 which is preferably mounted on a suitable mobile vehicle such as the bed 11 of a suitable truck 12 so that the unit may be readily transported from one location to another or maneuvered into operative position in connection with an irrigation ditch 13 to be cleaned. On top of the base member 10 pivotally mounted on a suitable trunnion 14 for rotation about the vertical axis 15 is the rotary table member 16 having the central support 17 and the side supporting struts 18. The rotary table member 16 may be rotated about the trunnion 14 by a suitable gear box 19 operated by the control lever 20 or by suitable power means if desired, the output from the gear box 19 being transmitted to the output shaft 21 to the pinion 22 which engages the large ring gear 23 secured to the base member 10.

A pair of lower parallel control arms 24 and 25 are each pivotally mounted on suitable trunnions at 26 on the member 17 and above the members 24 and 25 are the upper parallel members 27 and 28 pivotally mounted on suitable trunnions at 29 on the member 17. The rearward portions of the arms 24 and 25 are connected through links 30, shaft 31 and shaft 32 to the upper rearward portion of the arms 27 and 28.

On the front portion of the arms 24 and 25 is mounted the spindle housing 33 on suitable trunnions 34 while the upper portion of the spindle housing 33 is mounted through trunnions 35 to the outer forward portions of the arms 27 and 28. In this manner the arms 24—25 and 27—28 maintain the spindle housing 33 in vertical or parallel positions of movement for any upwardly or downwardly swung position of the arm members on the support member 17. A suitable fluid pressure cylinder 36 having an operating piston 37 connected to a piston rod 38 is pivotally mounted at 39 on a suitable trunnion pin carried on the members 16—17 while the outer end of the piston rod 38 is pivotally connected about a suitable pin 40 carried by the lower arm members 24—25.

Fixed to the links 30 is the main support frame 41—42 which carries a main drive engine or motor 43 having an output shaft 44 connected through a suitable clutch 45 to the engine 43. The universal joint 46 is connected to the output shaft 44 from which extends the propeller shaft 47 in turn connected through a universal joint 48 to the input bevel pinion shaft 49 suitably journaled in the spindle housing member 33. A bevel pinion 50 fixed on the bevel pinion shaft 49 in turn engages a bevel gear 51 fixed to the spindle 52 which in turn is suitably journaled in the spindle housing 33 and has mounted on its lower end a suitable cutter wheel 53 which is arranged to scrape and cut any growth 54 which may be present on the bottom or sides of the irrigation ditch 13, this spindle 52 rotating about the axis 55 which remains parallel to itself as the device is manipulated to various positions such as 55–$a$ or 55–$b$ in effecting the cleaning operation in the irrigation ditch.

In order to provide additional stability for the arms 24—25 and 27—28 there are provided a plurality of truss pivotal link arrangements as best shown in Fig. 3 which comprise lower trunnion portions 56 which are supported on suitable trunnion bearings at 57 in the lower arm members 24—25 and which have upper trunnion portions 58 journaled in suitable trunnion bearings at 60 in the upper support arms 27—28. Suitable side links 61 are connected to the portions 56 and 58 and preferably a truss structure 62 interconnects all of the side links and members 56 and 58. In this way a rigid box structure is provided for intermediate portions of the arm members 24—25 and 27—28 when lateral or sidewise forces are applied to the cutter 53 and the spindle housing 33 during the normal cleaning operations in the irrigation ditch.

There has thus been provided a universally operable irrigation ditch demosser and cleaner in which a cutter 53 may be moved up and down while maintaining its axis in parallel position such as 55—55$a$—55$b$ upon application of suitable fluid pressure to the cylinder 36. The main drive motor 43 continuously drives the cutter spindle 52 and the cutter 53 during said manipulative operation. Further, the entire unit may be swung around the vertical axis 15 by manipulation of the gear box by the handle 20 or other suitable power means and in addition thereto manipulation of the vehicle 12 provides still further nicety of control and positioning of the cutter 53 for a thorough cleaning of the irrigation ditch 13 and with a minimum of effort and no interference with the normal flow of water 63 in the irrigation ditch.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. In an irrigation ditch demossing and cleaning machine, a base member, a table rotatable on said base member, an upright support fixed on said table, a pair of lower support arms pivotally mounted on said upright support, a pair of upper support arms pivotally mounted on said upright support, links connecting the rear ends of said lower support arms to the rear ends of said upper support arms, a spindle housing pivotally mounted on the forward ends of said support arms, a spindle journaled in said spindle housing, a cutter fixed on the lower end of said spindle, a main drive motor mounted on said links on the rear end portions of said support arms, drive means connecting said main drive motor to said spindle, an actuating means between said table and said support arms to swing said arms relative to said table and upright support, and an actuating means between said table and said base member to rotate said table on said base member.

2. In an irrigation ditch demossing and cleaning machine, a base member, a table rotatable on said base member, an upstanding support fixed centrally of said table, a pair of horizontally spaced lower support arms pivotally mounted on each side of said upstanding support, a pair of horizontally spaced upper support arms pivotally mounted on each side of said upstanding support above said lower support arms, a cutter spindle housing vertically disposed between each of said pairs of support arms and pivotally connected to the outer ends thereof, a vertical cutter spindle journaled in said spindle housing, a cutter fixed on the lower end of said spindle, a main drive motor carried on said support arms, and a drive transmission connecting said motor to said cutter spindle.

3. In an irrigation ditch demossing and cleaning machine, a base member, a table rotatable on said base member, an upstanding support fixed centrally of said table, a pair of horizontally spaced lower support arms pivotally mounted on each side of said upstanding support, a pair of horizontally spaced upper support arms pivotally mounted on each side of said upstanding support above said lower support arms, a cutter spindle housing vertically disposed between each of said pairs of support arms and pivotally connected to the outer ends thereof, a vertical cutter spindle journaled in said spindle housing, a cutter fixed on the lower end of said spindle, a main drive motor carried on said support arms, a drive transmission connecting said motor to said cutter spindle, a fluid pressure actuating cylinder pivotally interconnected between said table and one of said pair of support arms to swing said arms and cutter spindle in vertical movements while maintaining parallelism of movement of the axis of rotation of said cutter spindle.

4. In an irrigation ditch demossing and cleaning machine, a base member, a table rotatable on said base member, an upstanding support fixed centrally of said table, a pair of horizontally spaced lower support arms pivotally mounted on each side of said upstanding support, a pair of horizontally spaced upper support arms pivotally mounted on each side of said upstanding support above said lower support arms, a cutter spindle housing vertically disposed between each of said pairs of support arms and pivotally connected to the outer ends thereof, a vertical cutter spindle journaled in said spindle housing, a cutter fixed on the lower end of said spindle, a main drive motor carried on said support arms, a drive transmission connecting said motor to said cutter spindle, and truss link means pivotally interconnecting said lower and upper pairs of support arms at spaced intervals along said pairs of arms.

5. In an irrigation ditch demossing and cleaning machine, a base member, a table rotatable on said base member, an upright support fixed on said table, a cutter spindle housing, a cutter spindle journaled in vertical position in said housing, a cutter fixed on the lower end of said housing, a lower pair of horizontally spaced support arms, an upper pair of horizontally spaced support arms, and pivotal connections between said support arms, cutter spindle housing and upright support with said pivotal connections arranged in parallelogram manner.

6. In an irrigation ditch demossing and cleaning machine, a base member, a table rotatable on said base member, an upright support fixed on said table, a cutter spindle housing, a cutter spindle journaled in vertical position in said housing, a cutter fixed on the lower end of said housing, a lower pair of horizontally spaced support arms, an upper pair of horizontally spaced support arms, pivotal connections between said support arms, cutter spindle housing and upright support with said pivotal connections arranged in parallelogram manner, link means pivotally interconnected in parallelogram manner at spaced longitudinal positions along said support arms.

7. In an irrigation ditch demossing and cleaning machine, a base member, a table rotatable on said base member, an upright support fixed on said table, a cutter spindle housing, a cutter spindle journaled in vertical position in said housing, a cutter fixed on the lower end of said housing, a lower pair of horizontally spaced support arms, an upper pair of horizontally spaced support arms, pivotal connections between said support arms, cutter spindle housing and upright support with said pivotal connections arranged in parallelogram manner, link means pivotally interconnecting said lower and upper support arms in the same parallelogram manner, a main drive motor mounted on said link means, and power transmission means connecting said motor to said cutter spindle.

ZANE W. MERKLEY.
WILLIAM NICHOLS.

No references cited.